US007328073B2

(12) United States Patent
Dolwin

(10) Patent No.: US 7,328,073 B2
(45) Date of Patent: Feb. 5, 2008

(54) CONTROLLER FOR PROCESSING APPARATUS

(75) Inventor: Anthony Craig Dolwin, Bristol (GB)

(73) Assignee: Toshiba Corporation, Tokyo (JP)

( * ) Notice: Subject to any disclaimer, the term of this patent is extended or adjusted under 35 U.S.C. 154(b) by 347 days.

(21) Appl. No.: 10/876,689

(22) Filed: Jun. 28, 2004

(65) Prior Publication Data

US 2005/0024927 A1    Feb. 3, 2005

(30) Foreign Application Priority Data

Jul. 8, 2003    (GB)    ................... 0315956.3

(51) Int. Cl.
*G05B 11/01*    (2006.01)
*G05B 13/02*    (2006.01)
(52) U.S. Cl. .............................. 700/11; 700/32; 700/33
(58) Field of Classification Search .................. 700/11, 700/33, 53, 9, 19, 61, 32
See application file for complete search history.

(56) References Cited

U.S. PATENT DOCUMENTS

| 5,222,239 | A |   | 6/1993 | Rosch |  |
|---|---|---|---|---|---|
| 5,640,563 | A | * | 6/1997 | Carmon | 718/102 |
| 5,812,860 | A | * | 9/1998 | Horden et al. | 713/322 |
| 6,378,081 | B1 | * | 4/2002 | Hammond | 713/501 |
| 6,823,516 | B1 | * | 11/2004 | Cooper | 718/108 |
| 2002/0116650 | A1 | * | 8/2002 | Halepete et al. | 713/300 |
| 2003/0061260 | A1 | * | 3/2003 | Rajkumar | 709/104 |
| 2003/0115239 | A1 | * | 6/2003 | Togawa | 709/102 |

FOREIGN PATENT DOCUMENTS

| WO | WO 00/20955 | 4/2000 |
|---|---|---|
| WO | WO 00/38038 | 6/2000 |

OTHER PUBLICATIONS

Padmanabhan Pillai, et al., "Real-Time Dynamic Voltage Scaling For Low-Power Embedded Operating Systems", 18th ACM Symposium on Operating Systems Principles, vol. 35, No. 5, pp. 1-14, Oct. 2001.
Ana Azevedo, et al., "Profile-Based Dynamic Voltage Scheduling Using Program Checkpoints", Proceedings 2002 Design, Automation and Test in Europe Conference and Exhibition, 8 pages, Mar. 2002.

(Continued)

*Primary Examiner*—Thomas K. Pham
(74) *Attorney, Agent, or Firm*—Oblon, Spivak, McClelland, Maier & Neustadt, P.C.

(57) ABSTRACT

The present invention relates to processing apparatus utilising dynamic scaling of voltage (DVS), and in particular although not exclusively to a controller for such apparatus. The invention is especially applicable to software defined radio (SDR), but is not so limited and may be applied to other re-configurable electronic systems. The present invention provides a controller for a processing apparatus having a plurality of processing resources, at least some of said resources having controllable supply voltage and/or frequency; the controller comprising: means for scheduling operations on said resources, at least some of said operations having a predetermined deadline by which the operation must be performed; means for determining a voltage and/or frequency profile for a said operation having a said deadline; and means for instructing the resources to perform said operations according to said schedule and said profile.

29 Claims, 6 Drawing Sheets

OTHER PUBLICATIONS

Hakan Aydin, et al., "Dynamic and Aggressive Scheduling Techniques for Power-Aware Real-Time Systems", Proceedings 22nd IEEE Real-Time Systems Symposium, 11 pages, Dec. 3-6, 2001.
Flavius Gruian, "On Energy Reduction for Hard Real-Time Tasks With Stochastic Execution Times", 5 pages.
Flavius Gruian, "Hard Real-Time Scheduling for Low-Energy Using Stochastic Data and DVS Processors", 20 pages.
Eric Rotenberg, "Using Variable-MHz Microprocessors to Efficiently Handle Uncertainty in Real-Time Systems", Microarchitecture, Micro-34., Proceedings., 34TH ACM/IEEE International Symposium, XP-010583669, Dec. 1, 2001, pp. 28-39.
Flavius Gruian, "Hard Real-Time Scheduling for Low-Energy Using Stochastic Data and DVS Processors", Internet Document, URL:http://delivery.acm.org/10.1145/390000/383092/p46-gruian.pdf?key1=383092&key2=0536799511&coll=portal&dl=ACM&CFID=2416853&CFTOKEN=57591586>, XP-002401638, Aug. 2, 2001, pp. 46-51.
Pedro Mejia-Alvarez, et al., "Power-Optimized Scheduling Server for Real-Time Tasks", Proceedings of the Eighth IEEE Real-Time and Embedded Technology and Applications Symposium, XP-010621752, Sep. 24, 2002, 12 pages.

* cited by examiner

CONTROLLER FOR PROCESSING APPARATUS

FIELD OF THE INVENTION

The present invention relates to processing apparatus utilising dynamic scaling of voltage (DVS), and in particular although not exclusively to a controller for such apparatus. The invention is especially applicable to software defined radio (SDR), but is not so limited and may be applied to other re-configurable electronic systems.

BACKGROUND OF THE INVENTION

Basic dynamic scaling voltage DVS processing modules exist in the prior art, for example the Intel™ Speedstep™ technology applied to many laptop computers in which the processor is allowed to enter a "sleep" mode when not in use in order to reduce power consumption from the battery. Recently processing modules have emerged which are able to operate at a number of different voltage and frequency or clock speed rates. Power consumption in a processor is a function of both voltage and clock speed or frequency, and as is known a quadratic reduction in power consumption can theoretically be achieved by reducing both these parameters. Transmeta™ provides Longrun™ power management technology which adjusts the voltage and clock speed of a processor in order to ensure the processor minimises the amount of time spent in idle, in which the processor is "on" but not used for processing.

A problem with such approaches however is that they are not well suited to tasks with hard deadlines, for example ensuring that a data block received by a wireless terminal is decoded by a Viterbi decoder algorithm within a set number of milliseconds. Processing execution time deadlines for certain operations in such systems are often defined by standard protocols in order that, for example the terminal can inter-operate with a base station in a wireless cellular or local area network.

Many of the tasks or operations in devices or systems such as wireless terminals operate according to one or more standards and can be implemented in a number of ways, for example by using specialised hardware accelerators such as ASIC's or by using a digital signal processor which is configured according to software. Often some of the processing or tasks overlap in time or are independent of other tasks and can therefore be performed in parallel, allowing the processing resource to allocate a slice of processing power to one task and another slice to another task. This might be achieved using multiple processors or timeslicing a resource such as a microprocessor for example.

Various methods of scheduling the processor time for a number of tasks are known in the art. Modifying such scheduling methodologies to incorporate the concept of reducing the voltage-frequency of the processing resource when dealing with certain tasks in order to reduce power consumption, is described in conceptual terms in Flavius Gruian "Hard Real-Time Scheduling for Low-Energy Using Stochastic Data and DVS processors", ISLPED'01, Aug. 2-7, 2001. However the practical implementation of such a system is non-trivial.

SUMMARY OF THE INVENTION

In general terms in one aspect the present invention provides a controller for a processing apparatus having multiple processing resources at least some of which have controllable voltage and/or frequency operational parameters. The controller comprises or accesses an operations data-structure comprising a number of execution parameters for each operation the apparatus is to perform. In a wireless terminal or base station for example this will be known in advance for given protocols, and the controller may be re-configurable in order to deal with new protocols. The execution parameters for each operation may comprise a voltage-frequency profile, a start time, worst case cycle count, and actual execution cycle count statistics for previous executions of the operation. These statistics are preferably updated over time as the operation is performed numerous times in order to provide a historical statistical basis for parameters such as average execution cycle count. A voltage-frequency profile calculating means provides or periodically updates the stored voltage-frequency profile for each operation based on these parameters. The voltage-frequency profile is arranged to minimise power consumption for each operation, for example by having the processing resource performing the operation initially at a low voltage-frequency, then only if the operation execution time overruns a predetermined limit (for example the average execution time) increase the voltage-frequency used by the processing resource in order to complete the operation within the hard execution time deadline.

Because each operation will not run to its worst case execution cycle count every time, but instead is more likely to run to the average execution cycle count or time, then the voltage-frequency of the processing resource performing the operation can be initially kept lower than normal in the expectation that even at this level the operation is likely to be completed before the operation deadline. Then if the operation is still being performed past a predetermined time, perhaps close to the deadline, then the voltage-frequency can be increased significantly in order to quickly finish the operation in order to meet the deadline. In the worst case cycle count, the power consumed will be the same as it would have been had the operation been performed at a constant higher (albeit for a shorter time) voltage-frequency level;. In cases where the operation is performed during or substantially during the initial low voltage-frequency level, then less power is consumed than if this operation had been performed using a constant higher voltage-frequency level. Therefore, overall less power will be consumed by this apparatus which will improve battery life for portable devices such as mobile wireless communications or computing terminals.

In particular in one aspect the present invention provides a controller according to claim 1.

BRIEF DESCRIPTION OF THE DRAWINGS

Embodiments of the present invention are described with respect to the following drawings, by way of example only and without intending to be limiting, in which.

DETAILED DESCRIPTION

Figure 1:
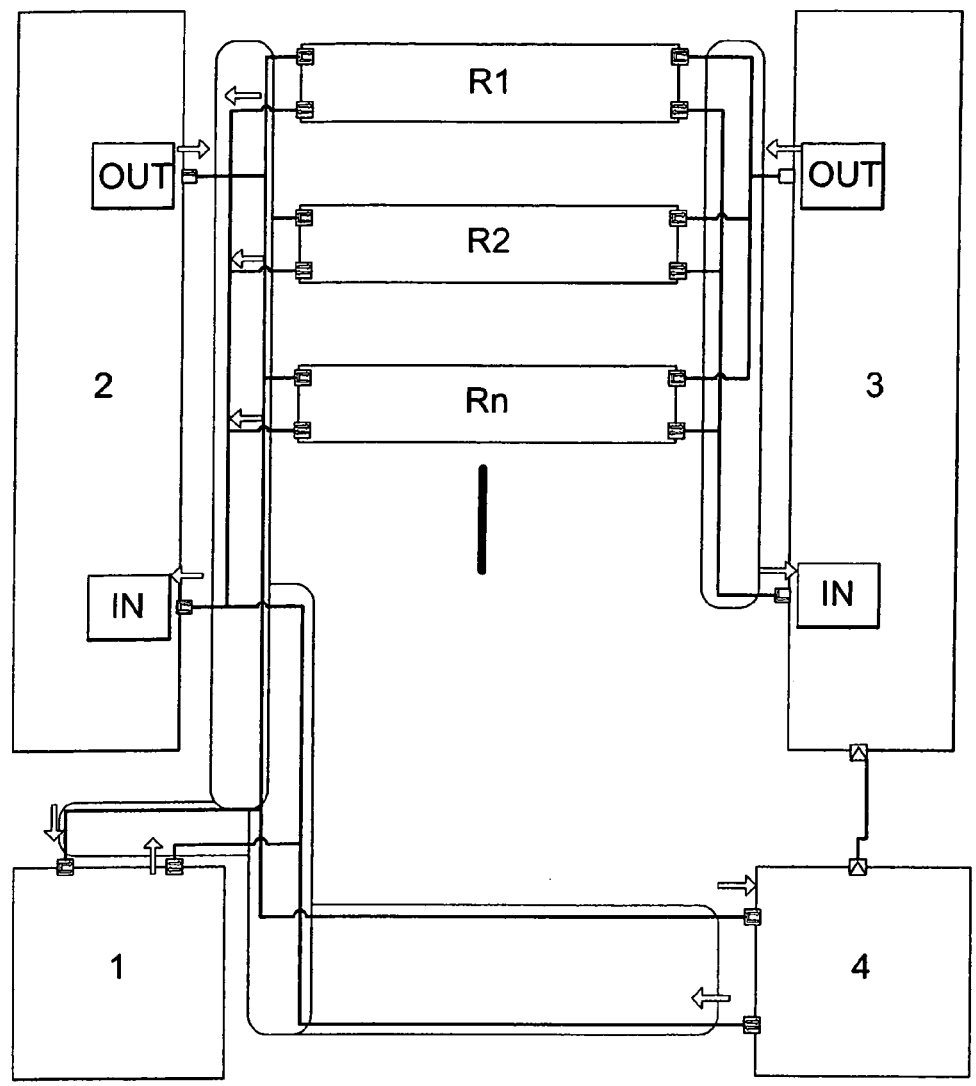
FIG. 1 is a schematic of an architecture for a processing apparatus.

Referring to FIG. 1, the architecture of a processing apparatus according to an embodiment comprises a plurality of processing resources R1-Rn, a controller 1, a control plane 2, a data plane 3 and a data-bus controller 4. The processing apparatus might be used in a wireless communications terminal for receiving and sending signals to a base station according to one or more protocols such as UMTS and GSM for example. The apparatus is particularly suited to software defined radio (SDR) applications, and for convenience and ease of explanation the embodiment will be described with respect to mobile wireless communications applications, although it is not so limited.

The processing resources R could be ASIC's for specific wireless communications processing such as a Viterbi decoder for example, they could also be reconfigurable digital signal processing (DSP) blocks with multiple uses, or similarly reconfigurable field programmable gate arrays (FPGA's)

The data plane 3 is a logical entity comprising a data-bus coupled to a memory resource and input/output interfaces to other resources, for example analogue-to-digital converters, digital-to-analogue converters, channel decoder, equaliser and vocoder. The memory is used to store sampled signal symbols as well as those symbols and associated data following various stages in the processing chain to obtain decoded traffic data.

The data-bus controller 4 controls access between the various resources R and the memory and other data plane components; allowing for example a resource to read appropriate data and then write data back to the memory following processing by the resource.

The control plane 2 is another logical entity comprising a control-bus between the resources R and the controller 1. Both the data and control planes could also be implemented as a cross-bar or network for example.

The controller 1 controls operation of the data plane 3 via the data-bus controller 4 in order to ensure that the data in the data plane passed to the right resource R for processing and that demands for -data transfer by competing entities are handled appropriately. The fabric used to transfer data might also be capable of being switched to run at different v-f depending on the configuration of the system. Like all other resources the data plane would be configured by the controller, via the 'data bus controller/arbiter'. Those skilled in the art will be familiar with the operation of data bus controllers.

In general terms, the controller, ensures that data in the data plane is properly processed by the various resources R, in the right order and if possible in parallel by splitting operations into tasks or groups of tasks that can be performed using different resources. Additionally, the controller 1 controls the voltage-frequency (v-f) of each resource R in such a way that the required processing is carried out with a minimum of power consumption. Many of the processing tasks will have predetermined deadlines by which processing must be finished and so the controller 1 is arranged to control the processing in the apparatus according to this constraint whilst at the same time minimising power consumption. This is advantageous in portable terminals having processing tasks with hard deadlines such as wireless communications terminals for example.

Figure 2:
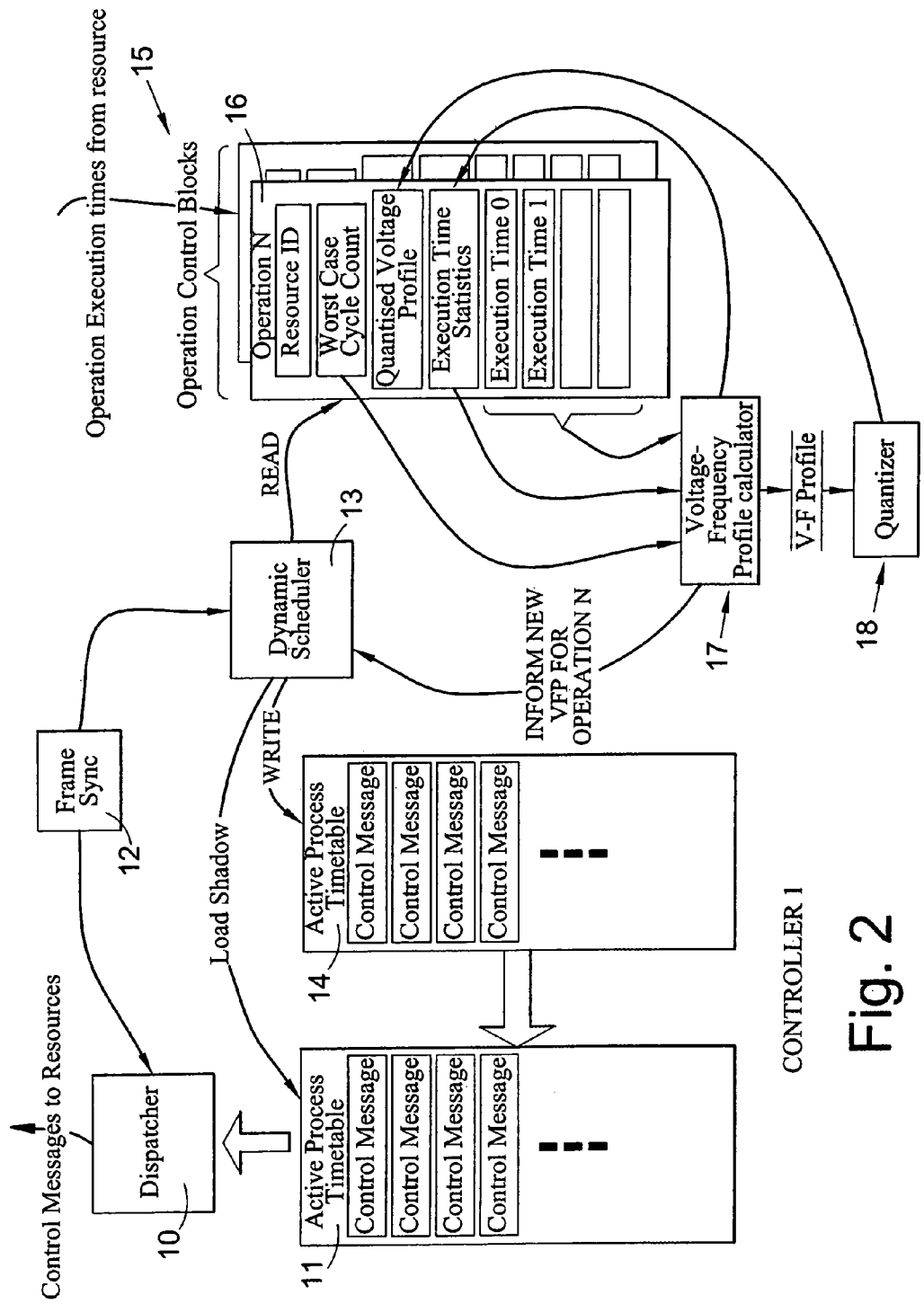
FIG. 2 is a schematic of a controller for the processing apparatus of FIG. 1.
Figure 3:
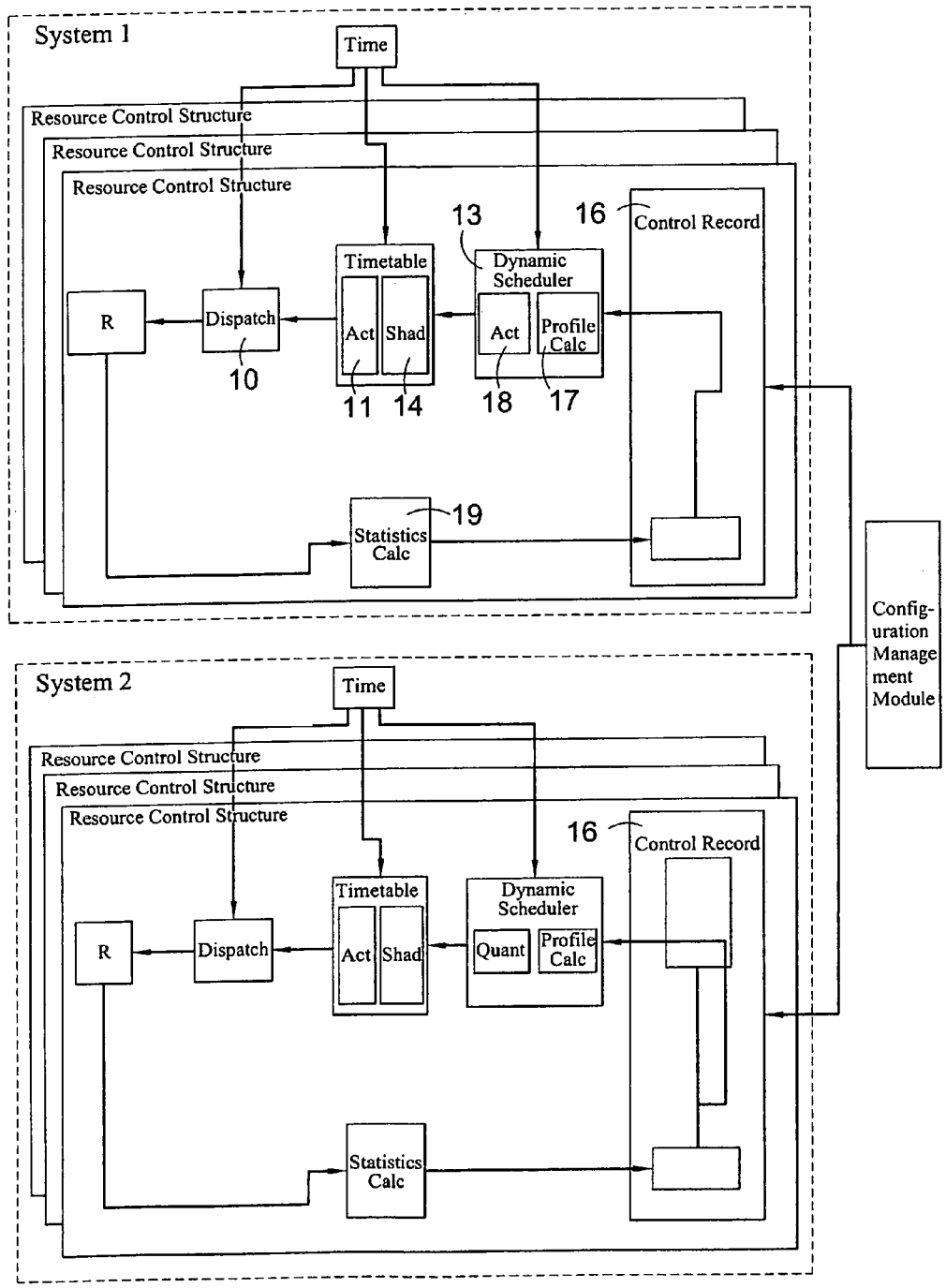
FIG. 3 is a schematic showing the control structure of the controller for each resource controlled by the controller of FIG. 2.

FIG. 2 shows the controller 1 schematically, and FIG. 3 shows the control structures embodied by the controller 1 for each resource; including two sets of resources R using different time bases, for example GSM and UMTS. The controller 1 comprises a dispatcher 10 which controls forwarding of control messages to the appropriate resource R. The dispatcher 10 determines what control messages to send to what resource R at what time according to a process timetable 11. The process timetable 11 is a data-structure which comprises a list of control messages each having an associated resource identifier and a start time. The start time is usually relative to a predetermined time reference such as a10 ms radio frame in the case of WCDMA. Wireless communications signals are transmitted within frames to which a receiver synchronises itself in order to properly receive and process the signals. A frame sync source 12 derived from an internal clock signal for example is supplied to the dispatcher 10 to ensure that the processing operations are properly synchronised as between each other.

Each control message will contain a transmission time, destination, a command, voltage-frequency setting and configuration information. The nature and timing of the control messages in the process timetable 11 is determined by a dynamic scheduler 13. The scheduler 13 writes or updates control messages in a shadow process timetable 14 which is another data-structure having the same structure as the active process timetable 11. The active process timetable 11 is typically loaded with the contents of the shadow process timetable 14 at some convenient time, for example at the end/start of a frame. A shadow timetable is used because changes to the timetable would take a finite amount of time to write into the table and while this is happening the timetable would have incomplete data and so may result in faulty commands being sent to the resources. The controller updates the control messages for various operations as events change. For example an operation may finish early freeing up one of the resources earlier than expected and the controller may therefore re-assign a later scheduled operation to the newly freed up processing resource R.

Figure 4:
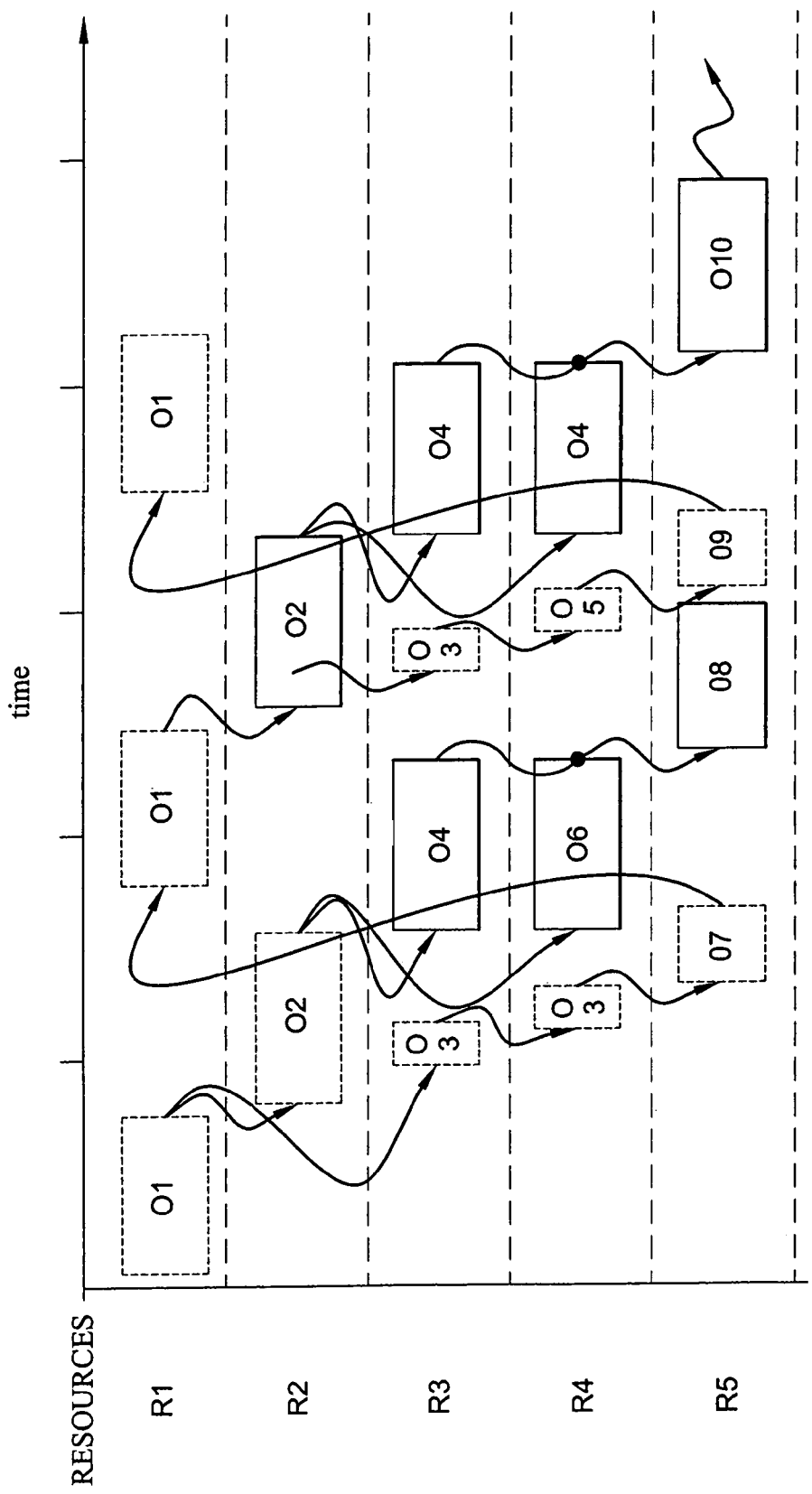
FIG. 4 is a scheduling schematic showing the timing of various operations performed on a number of parallel processing resources.

FIG. 4 shows a schedule for operations O1-O10 which are distributed over time and over 5 processing resources R1-R5. Some of the operations require data from a previous operation and so can't be started until after that operation has been completed, whereas other operations can run in parallel. Schedulers for scheduling operations over a number of processing resources are known in the art. Typically prior art schedulers will schedule operations based on their worst case cycle count, that is the number of processing cycles that the processing resource will have to perform in the worst case situation in order to complete the operation. From this it can be determined what the maximum execution time of an operation is and this is then used to schedule the operation in with the other required operations. However often operations will not require their worst case cycle count and instead will finish early. Dynamic schedulers can dynamically change the schedule to take account of the fact that operations sometimes finish early, and perhaps start a later scheduled operation early. Such dynamic schedulers are also known in the art.

The controller 1 also comprises an operations control block data-structure 15 which comprises a control block or record 16 for each operation the processing apparatus is to carry out. The record 16 of each operation comprises a number of parameters associated with the operation including its Worst case cycle count, a resource identifier (R1-Rn), a voltage frequency (v-f) profile, and preferably execution time statistics corresponding to previous executions of the operation in the processing apparatus. These include past execution times, (execution time Ø, executing time 1 . . . ), that can be used to implement filtering of the values before statistics are calculated.

The controller also comprises a voltage frequency profile calculator 17 which determines the v-f over the worst case execution time of the operation, and is used to control the v-f operating parameters of the resource R performing the operation. A quantiser 18 adjusts the output of the v-f profile calculator 17 to one of the achievable or practical v-f points associated with the resource R. The quantiser and profile calculation can be done in a single block e.g. when only 2 voltage settings are being used. The quantised v-f profile for the processing resource R associated with the operation is then written to that operation's control block or record 16.

Figure 5A:
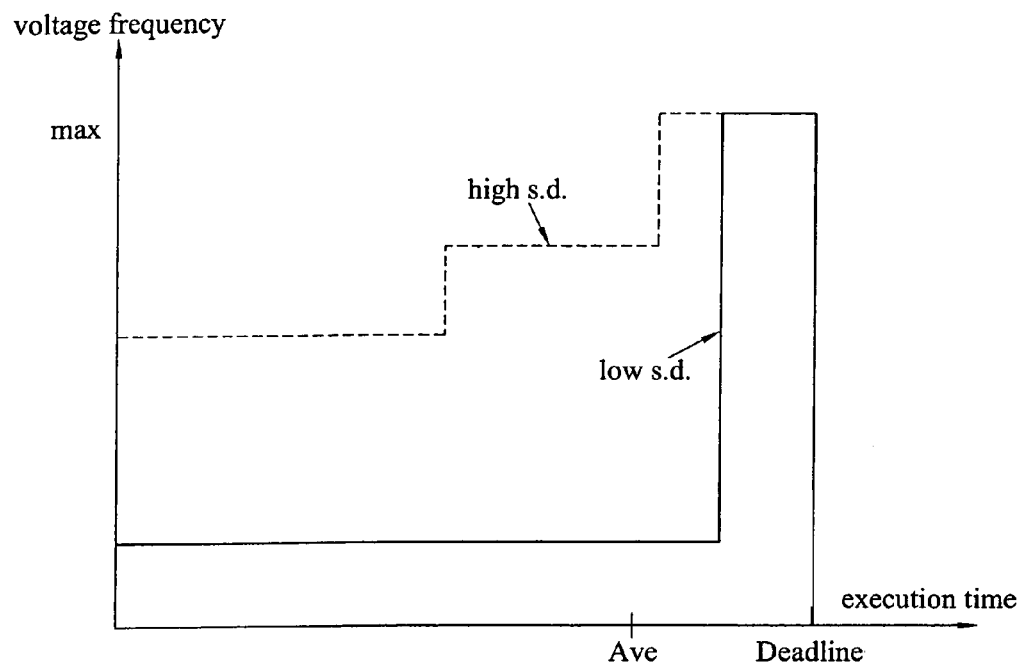
FIGS. 5a and 5b show voltage-frequency profiles for an operation.

The v-f profile for each operation will typically start off at a certain level and then, if necessary increase this level as the operation's hard deadline is approached, as shown in FIG. 5a. This takes advantage of the fact that on many occasions the operation will not require its worst case cycle count and will therefore finish early. By keeping the v-f low at first, many executions of the operation will be performed using this low v-f only, and therefore on average power consumption associated with this operation will be reduced. In the instances where the operation requires its worst case cycle count, or a cycle count approaching this, then the v-f is increased in order to ensure the operation is finished by its deadline.

Figure 5B:
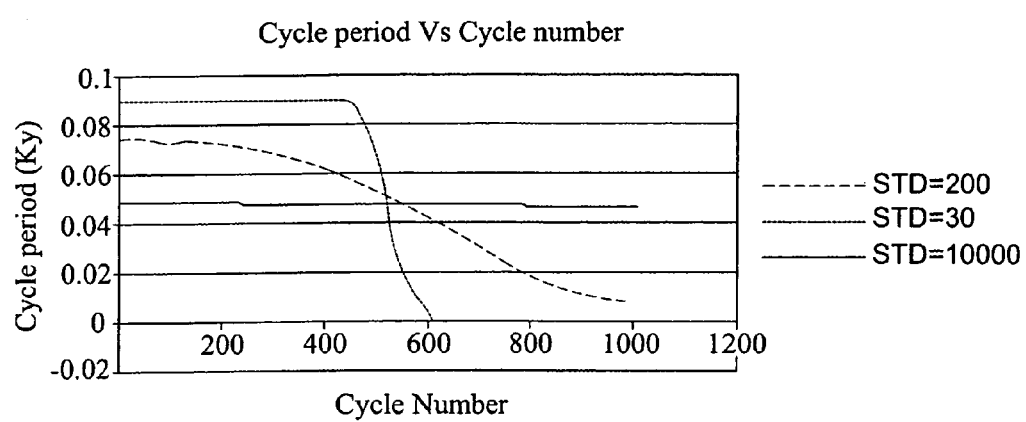

The v-f profile for each operation is influenced by the historical execution statistics for that operation. For example if the operation has an average execution time or cycle count that has a low standard deviation, in other words there is not much variation, then the initial v-f level can be set low such that the average execution time will be reached at this low v-f near the hard deadline. The v-f level can then be raised significantly in order to ensure the operation finishes before its hard deadline for those executions when the operation requires more than its average number of cycle counts. For operations having a high standard deviation, that is there is a lot of variation in the execution times, then the v-f level will initially be higher in order to ensure-that the operation finishes before its hard deadline for all execution situations. FIG. 5b shows the cycle period vs. cycle number for three standard deviation values, for an average execution cycle count of 500 and a standard deviation that varies between 30 and 10000. Ultimately the calculation is based on cycle count but a conversion can be made from execution time to cycle count and similarly a conversion could also be made with higher level metrics such as average and deviation of the number of iterations of a turbo decoder which could be mapped to the equivalent cycle count statistics.

The dynamic scheduler 13 can be arranged to retrieve the v-f profiles from the appropriate operation's control block 16 for each operation or task it writes to the process timetables 11 and 14 as indicated in FIG. 2. Alternatively the dynamic scheduler 13, may retrieve parameters such as the operation's worst count, average count, deadline and from these derive a voltage frequency profile as indicated in FIG. 3.

The operations will be scheduled as before referring to FIG. 4, that is the operation execution time will be the same, however additional v-f controls will be added to the process timetable in order that the resource R performing the operation will operate according to the v-f profile during execution of the operation. Thus the overall execution time of the operation is unaffected, however its v-f levels will vary according to the determined v-f profile.

Each of the resources R has its own supply voltage and clock frequency, and the controller sets the voltage-frequency for each module. Because each module R can operate off a separate clock the interface to the data plane will be asynchronous, and in addition it must also buffer the different operating voltages.

The resources R are usually specialized data processing blocks with limited control code, that is they receive data, process it and then pass it on. The controller 1 determines how and when each resource operates. All data transfer between resources goes via the data plane. All control messages and measurement reports go via the control plane. The data plane is also regarded as a resource and so its characteristics can also be controlled via the data bus controller. For example its v-f may be adjusted when interacting with a particular resource R.

Each resource executes an operation when instructed to do so by the controller 1. Within the control processor the dispatcher reads the Process Timetable and sends messages to each resource just before the resource is expected to process data. The message will contain configuration information and a command word. In this way the resources can be statically scheduled to implement the required functionality.

One of the commands that can be sent to a resource is a voltage-frequency command. This command will set the supply voltage to the resource and also the operating frequency. The resource comprises a counter to count the actual number of cycles. Alternatively the resource may contain a timer, operating off a standard clock. This is used to time how long the operation takes to complete i.e. the actual execution time. On completion the resource will send, in a message, the execution time and operation handle to the controller. The cycle operation time will vary due to the voltage-frequency ramping itself but also because the operation may take a different number of cycles to complete. The reasons for changes in cycle count include: the processing required is dependant on the data for example a voice decoder; the resource shares a data bus with another resource so may be blocked while the second resource uses the bus; the system may dynamically modify the processing implemented by the resource as a result of a change in an external condition for example, the number of iterations of Turbo decoder may change as a result of a change in the channel conditions. The controller 1 calculates the actual cycle count from the actual execution time using its knowledge of what the voltage-frequency ramp was. An alternative to measuring the execution time is to use a counter in the resource to count the number of cycles directly.

The controller 1 stores execution times/cycle counts sent by each resource, at the end of each operation, in the respective operation control block data record 16. The operation control block 15 is initialized with the worst-case cycle count and start time relative to frame period i.e. earliest time operation can start because of availability of data from other operations; and its relative timing deadline when an operation is created. If the statistics of this operation are known at design time the average cycle count and standard deviation may also be set at initialisation. In this case a flag is set to indicate that the actual execution times are not required and in addition the voltage-frequency profile needs only be calculated when the relative timing deadline changes. The controller 1 includes a statistics calculator 19 to update statistics such as the average cycle count and standard deviation for each operations control block record 16.

When either the static resource schedule changes or the voltage-frequency profile for any operation changes the messages in the process time table 11 and 14 are updated with the correct value for the voltage-frequency. To avoid an excessive amount of time spent calculating new voltage-frequency profiles it is likely that this will only be done at relatively infrequent intervals, for example the end of a frame.

By increasing the voltage-frequency during the execution of an operation the power consumption is reduced if the operation takes less than its average cycle count but still achieves its deadline if the worst case cycle count is encountered. This makes it ideally suited to hard realtime applications such as wireless terminals especially if they are designed to be reconfigurable—Software Defined Radio.

Figure 6:
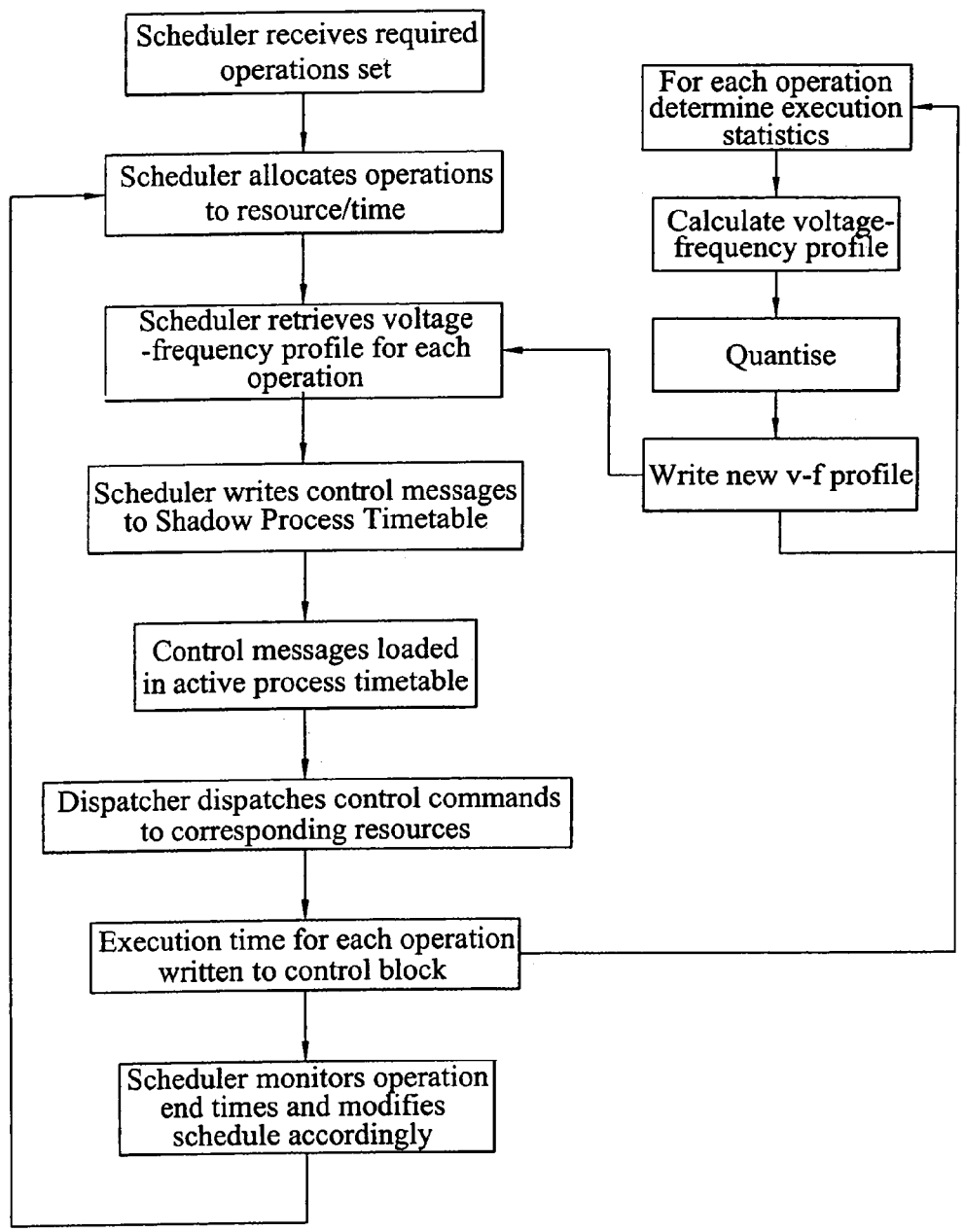
FIG. 6 shows a flow chart of operation of the controller of FIG. 2.

Referring to FIG. 6, a flow chart of the operation of the controller 1 is shown. The dynamic scheduler 13 receives a definition of the data flow between operations which includes a set of required operations and their timing constraints from a Configuration Management Module. For example in a SDR terminal, this may correspond to receiving cellular calls in GSM. The operations required to achieve the reception and transmission of the GSM signals are then downloaded to the scheduler 13. The scheduler 13 determines an initial schedule by splitting the operations up and allocating them to different processing resources R at appropriate times as illustrated in FIG. 4. The scheduler 13 then reads the v-f profile data for each operation from the appropriate operation control blocks 16, and writes appropriate control messages to the shadow process timetable 14. At an appropriate point (in absolute time) these are loaded into the active process timetable 11 and forwarded by the dispatcher 10 to the appropriate resource R.

Following completion of an operation by a resource R, a completion message is sent to the controller 1 and includes the execution time and/or execution cycle count for the operation. This information is forwarded to the appropriate control block 16 where it is added to the statistical information stored on the operation. The scheduler 13 also monitors the operation end times and may dynamically reschedule later operations if the completed operation finished early.

The v-f profile for each operation is calculated from the statistical execution time data stored in the operation blocks 16, and is quantised to practical v-f points for the resource R and then stored in the operations block 16 for that operation (or delivered directly to the dynamic scheduler). The v-f profile is updated periodically as the statistical data mounts.

The process timetable is preferably updated as follows:
a. Find all messages requesting an operation.
b. Purge all stale voltage-frequency commands associated with this operation from the list
c. Add new voltage-frequency commands to the list using new voltage-frequency settings.

Alternatively, some resources may be able to self modify their voltage-frequency setting internally. So in such a scenario the configuration message sent to a resource will contain a set of voltage-frequency values and their associated relative timings. So when these values are changed only the configuration command needs to be modified.

A further enhancement to this scheme uses more than one process timetable 11 (and associated shadow 14), as is illustrated in FIG. 3(system 1 and 2). Each timetable runs from a different timebase and frame sync. This can be used when two systems such as GSM and UMTS are being implemented on the same platform. In such a system the two frame sync time periods are different and operate out of phase with each other, and without multiple timetables the common denominator would be very high and hence the timetable would be very long. This can be further extended to each operation on a resource or each resource with multiple operations has its own timetable, v-f profile, calculator, etc. This simplifies access to the timetable. The overlapping of resources (e.g. data bus) between two systems (GSM and UMTS) is possible but scheduling becomes difficult because of the different timebases i.e. the scheduling would have to run across a common multiple making it very big.

In alternative arrangements only one of voltage or frequency may be adjusted such that a separate voltage profile or frequency profile is calculated for the operations to be performed. For example the frequency might be set so the operation completes at a specific time and this might simplify the scheduler and reduce resource requirements e.g. output data will only be written into global memory at the end of an operation and then be immediately read by another operation hence freeing up RAM.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analog array or similar device in order to configure analog hardware.

The skilled person will also appreciate that the various embodiments and specific features described with respect to them could be freely combined with the other embodiments or their specifically described features in general accordance with the above teaching. The skilled person will also recognise that various alterations and modifications can be made to specific examples described without departing from the scope of the appended claims.

The invention claimed is:
1. A controller for a processing apparatus having a plurality of processing resources, comprising:
a processor or control code for a processor arranged to schedule operations on said processing resources;
a processor or control code for a processor arranged to determine, for an operation having a deadline, a voltage-frequency profile based an average cycle count and a standard deviation of the average cycle count of the operation; and a processor or control code for a processor arranged to instruct the processing resources to perform said operation according to said schedule and said profile.

2. A controller according to claim 1 wherein the profile is arranged to minimise the average power consumed by the apparatus in performing the operation.

3. A controller according to claim 1 wherein the voltage-frequency profile has more than two voltage or frequency operating points.

4. A controller according to claim 1 wherein the voltage-frequency profile includes voltage or frequency operating points which increase over an execution time of the operation.

5. A controller according to claim 4 wherein the voltage-frequency profile increases the voltage or frequency operating points if the operation has not been completed within the average cycle count of the operation.

6. A controller according to claim 1, comprising:
an operation control data structure comprising a record corresponding to the operation, the record comprising a worst case cycle count of the operation.

7. A controller according to claim 1, comprising:
a voltage-frequency profile calculator arranged to calculate said voltage-frequency profile for said operation based on a worst case cycle count of the operation, the average cycle count of the operation, and the standard deviation of the average count.

8. A controller according to claim 7, further comprising:
a processor or control code for a processor arranged to quantise the voltage-frequency profile determined by the calculator to correspond to available voltage and/or frequency operating points of the processing resources.

9. A controller according to any claim 1, comprising:
a process timetable having a control message for the processing resources, the control message corresponding to the operation and containing voltage and/or frequency control instructions.

10. The controller of claim 1, wherein said voltage-frequency profile is periodically updated.

11. A processing apparatus having a plurality of processing resources, comprising:
a processor or control code for a processor arranged to schedule operations on said processing resources;
a processor or control code for a processor arranged to determine a voltage-frequency profile for an operation having a deadline based on an average cycle count and a standard deviation of the average cycle count of the operation; and
a processor or control code for a processor arranged to instruct the processing resources to perform said operation according to said schedule and said profile.

12. An apparatus according to claim 11, comprising a wireless terminal or base station.

13. The processing apparatus of claim 11, wherein said voltage-frequency profile is periodically updated.

14. A computer program product carrying code for configuring a configurable device having a controller for a processing apparatus having a plurality of processing resources, comprising:
a processor or control code for a processor arranged to schedule operations on said processing resources;
a processor or control code for a processor arranged to determine, for an operation having a deadline, a voltage-frequency profile based on an average cycle count and a standard deviation of the average cycle count of the operation; and
a processor or control code for a processor arranged to instruct the processing resources to perform said operation according to said schedule and said profile.

15. The computer program product of claim 14, wherein said voltage-frequency profile is periodically updated.

16. A method of controlling a processing apparatus having a plurality of processing resources, comprising:
scheduling operations on said resources;
determining, for an operation having a deadline, a voltage-frequency profile based on an average cycle count and a standard deviation of the average cycle count of the operation; and
instructing the resources to perform said operation according to said schedule and said profile.

17. A method according to claim 16 wherein the profile is arranged to minimise the average power consumed by the apparatus in performing the operation.

18. A method according to claim 16 wherein the voltage-frequency profile has more than two voltage or frequency operating points.

19. A method according to claim 16 wherein the voltage-frequency profile includes voltage or frequency operating points which increase over the execution time of the operation.

20. A method according to claim 19 wherein the voltage-frequency profile increases the voltage or frequency operating points if the operation has not been completed within the average cycle count of the operation.

21. A method according to claim 16 wherein said determining comprises:
generating an operation control data-structure comprising a record corresponding to the operation, the record comprising a worst case cycle count of the operation.

22. A method according to claim 21 wherein each record comprises a voltage and/or frequency profile.

23. A method according to claim 16 wherein the determining comprises:
calculating said voltage-frequency profile for said operation based on a worst case cycle count of the operation, the average cycle count of the operation, and the standard deviation of the average count.

24. A method according to claim 23 wherein the determining further comprises:
quantising the calculated voltage-frequency profile to correspond to available voltage and/or frequency operating points of the resources.

25. A method according to claim 16 wherein the scheduling comprises:
generating a process timetable having a control message for the resources, the control message corresponding to the operation and containing voltage and/or frequency control instructions.

26. A method according to claim 16 wherein the processing apparatus is a wireless terminal or base station.

27. The method of claim 16, wherein said voltage-frequency profile is periodically updated.

28. A computer readable medium storing a computer code readable by a processor in order to carry out a method of controlling a processing apparatus having a plurality of processing resources, comprising:

scheduling operations on said resources;
determining, for an operation having a deadline, a voltage-frequency profile based on an average cycle count and a standard deviation of the average cycle count of the operation;
instructing the resources to perform said operation according to said schedule and said profile.

29. The computer readable storage medium of claim 28, wherein said voltage-frequency profile is periodically updated.

* * * * *